May 23, 1950     C. P. BERGSTROM     2,508,810

LETOFF FOR LOOMS

Filed June 28, 1947

INVENTOR
CARL P. BERGSTROM
Chas. T. Hawley
ATTORNEY

Patented May 23, 1950

2,508,810

UNITED STATES PATENT OFFICE 2,508,810

LETOFF FOR LOOMS

Carl P. Bergstrom, Millbury, Mass., assignor to Crompton & Knowles Loom Works, Worcester, Mass., a corporation of Massachusetts Application June 28, 1947, Serial No. 757,730

9 Claims. (Cl. 139—110)

This invention relates to improvements in letoffs for looms and more particularly to a letoff operated by the loom to turn the beam as the weaving operation continues.

A form of letoff mechanism which has gone into extensive use employs a weighted casing attached to the warp beam by a worm and worm wheel gearing operated by the loom to effect periodic retrograde movement of the casing with respect to the beam as the latter turns to deliver warp. The letoff employs a shaft to which a hand wheel is attached for the purpose of manually turning the beam. During loom operation the shaft and the worm, which is on the shaft, are turned by a pinion and rack, the latter being moved positively by a regularly moving part of the loom. In certain installations of this letoff it has been found that when the shaft is turned by the rack the hand wheel due to its momentum tends to turn the shaft and worm too far and causes the warp beam to turn more than is desired and let off excess warp.

It is an important object of the present invention to provide means by which the hand wheel will be normally disconnected from the aforesaid worm and worm wheel gearing but can be connected to the gearing for manual operation.

The letoff mechanism of the type to which the invention more particularly relates includes a clutch operatively interposed between a rack and pinion mechanism and the worm. The clutch comprises two parts or members which are normally held together by a spring, but one of the parts can be moved manually to disconnect the pinion and the part of the clutch formed with it from the other clutch member which turns with the worm. Heretofore letoffs of this type have required two manual operations for reversal of the beam, one of these operations being movement of the driving clutch member to inoperative position, and the other being manipulation of the hand wheel.

It is a further object of the present invention to interconnect the hand wheel and the driving clutch member in such manner that whenever the hand wheel is moved to driving position relatively to the worm the clutch will be automatically disconnected.

With these and other objects in view which will appear as the description proceeds, my invention resides in the combination and arrangement of parts hereinafter described.

Figure 1:
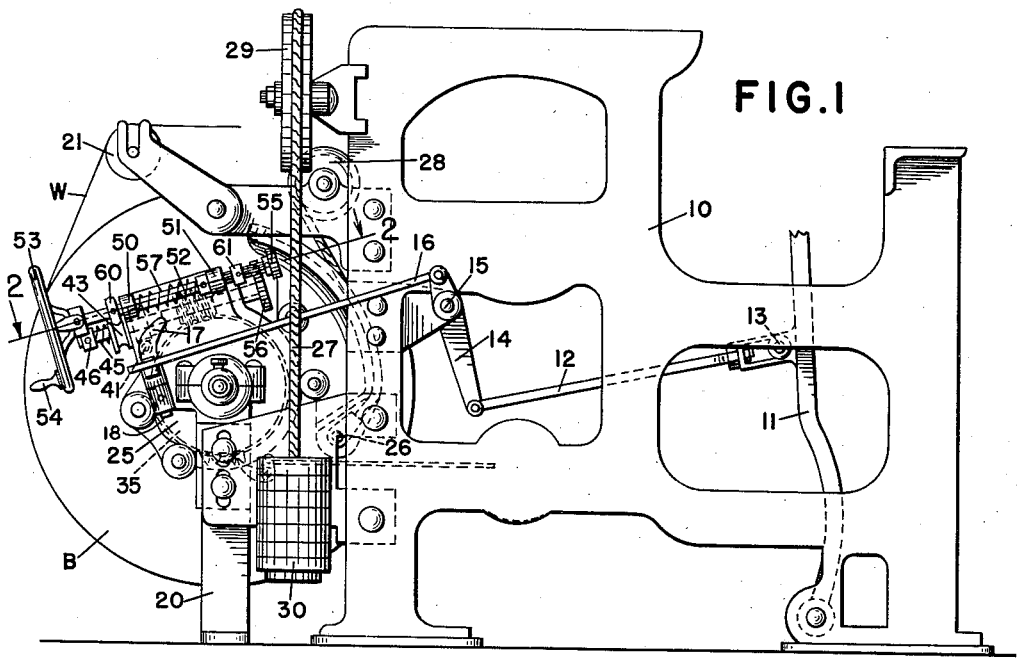
Figure 2:
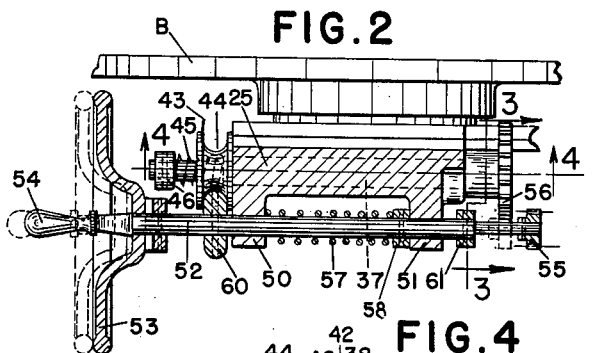
Figure 3:
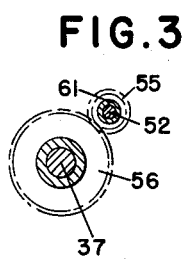
Figure 4:
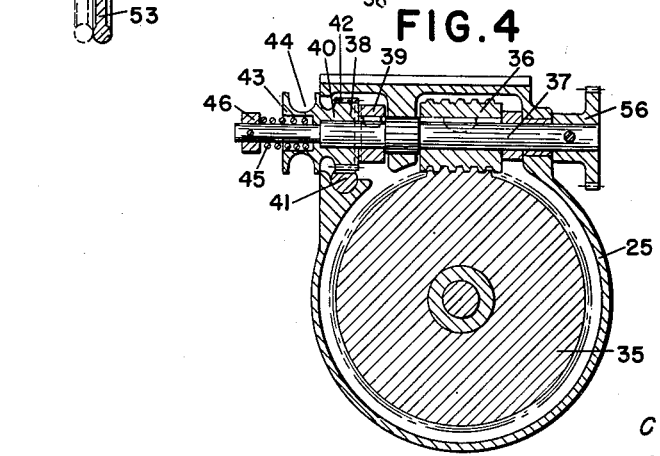
Figure 5:
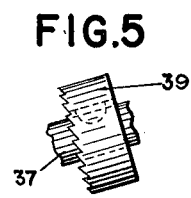

In the accompanying drawings, wherein a convenient embodiment of my invention is set forth:

Fig. 1 is a side elevation of the rear part of a loom showing a letoff mechanism having my invention applied thereto, Fig. 2 is an enlarged longitudinal section on line 2—2 of Fig. 1, Fig. 3 is a transverse section on line 3—3 of Fig. 2, Fig. 4 is a vertical section on line 4—4 of Fig. 2, and Fig. 5 is a side elevation of the driven clutch member.

Referring particularly to Fig. 1, the loom frame 10 supports a lay 11 which swings backwardly and forwardly in usual manner during loom operation. A rod 12 connected as at 13 to the lay extends rearwardly and is attached to a lever 14 pivoted as at 15. A second rod 16 extends rearwardly from lever 14 and is connected to an actuator or wing lever 17 turning on a stationary pivot stud 18. A stand 20 at the rear of the loom provides pivotal support for lever 17 and supports the warp beam B from which the warp W extends upwardly and over a whip roll 21 and then forwardly in usual manner.

A casing 25 coaxial with the beam is connected as at 26 to a rope or cable 27 which extends upwardly behind a guide pulley 28 and then over a support pulley 29 and down to a weight 30 which tends normally to move the casing in a counter-clockwise direction as viewed in Fig. 1. A worm gear 35 turning with the warp beam meshes with a worm 36 secured to a shaft 37 rotatable on the casing 25. A clutch designated generally at 38 comprises a driven clutch member 39, see Figs. 4 and 5, secured to shaft 37 and a driving clutch member 40 rotatable on shaft 37.

A transverse rack 41 is slidably mounted in the casing 25 and has a part thereof in position for engagement with the wing lever 17 whenever the warp beam and casing by movement in a clockwise direction as viewed in Fig. 1 moves the rack into the path of movement of lever 17. The rack meshes with rack teeth 42 on the driving clutch member 40 and causes the latter to turn whenever the rack is moved toward the beam by lever 17. The rack returns to its normal position when lever 17 swings outwardly or away from the casing 25.

The driving clutch member 40 has a hand hold 43 having a groove 44 for the operator's fingers, and a compression spring 45 limited as to left hand movement, see Fig. 4, by collar 46 secured to shaft 37, tends normally to hold the clutch members in driving or engaging position.

Lever 17 will have a rocking movement toward the casing 25 for each reciprocation of the lay and if the rack bar is in its path driving clutch member 40 will turn in a clockwise direction as viewed in Fig. 3 and by means of driven clutch member 39 will rotate shaft 37 and the worm 36. The worm gear 35 is thus turned in a direction to permit retrograde movement of the casing 25 relatively to the warp beam, or movement in a counter-clockwise direction as viewed in Fig. 1, thereby moving the rack 41 rearwardly. As the warp beam continues to turn rack 41 will again be brought into the path of movement of lever 17. The clutch members can be separated by movement of the driving member 40 to the left as viewed in Fig. 4 by manual operation of the hand hold 43, and when released will return to normal position under action of spring 45.

The matter thus far described is of common construction and if desired may be made as set forth in prior patents to Payne Nos. 1,803,143 and 2,419,419.

In carrying my present invention into effect I provide normally idle means movable manually to operative position to permit turning of the casing 25 relatively to the warp beam for manually controlling the letoff mechanism and also automatic disconnection of the driving member 40 from the driven member 39 of clutch 38. Casing 25 is provided with two bearings 50 and 51 in which is slidably and rotatably mounted an auxiliary shaft 52 to the left end of which as viewed in Fig. 2 is secured a hand wheel 53. The latter may if desired be provided with a handle 54 to facilitate rapid turning. The right end of shaft 52, see Fig. 2, has secured thereto a pinion 55 normally out of mesh with a gear 56 secured to the previously described shaft 37. A compression spring 57 acts on collar 58 secured to shaft 52 and normally holds the shaft 52, the hand wheel 53, and the pinion 55 in the normal full line position shown in Fig. 2 with the pinion 55 beyond or to the right of gear 56.

Secured to shaft 52 is a collar 60 having a rounded periphery which enters the groove 44 of the hand hold 43. When the parts are in their normal positions the collar 60 permits engagement of the driving clutch member 40 with the driven member 39. The parts remain in this position during usual operation of the letoff mechanism and the clutch member 40 is free to rotate with collar 60 in its groove 44.

If for any reason it becomes necessary to operate the letoff manually, the hand wheel 53 will be moved to the left to its abnormal or operative position shown in dotted lines in Fig. 2, thereby meshing pinion 55 with gear 56, and causing collar 60 to move clutch member 40 out of driving relation with respect to driven clutch member 39. A stop collar 61 engages bearing 51 to prevent further left hand movement of shaft 52 after pinion 55 has meshed correctly with gear 56 and clutch 38 has been disengaged. With the hand wheel in its abnormal or operative position the shaft 37 can be turned either backwardly or forwardly to cause the desired rotation of worm 36. When manual operation is completed the hand wheel is released and spring 57 will return the pinion 55 to its normal inoperative position and will also return the driving clutch 40 to driving position.

The automatic control of driving clutch member 40 may or may not be used, as desired, and it is for this reason that both compression springs 45 and 57 are described herein. If the collar 60 is used either of the springs 45 or 57 acting alone will be sufficient to return the hand wheel to normal position. If, on the other hand, the collar 60 is omitted there will then be no connection between spring 45 and shaft 52, and both springs 45 and 57 will be needed, spring 45 to return hand hold 43, and spring 57 to return the hand wheel to its normal idle position.

From the foregoing it will be seen that I have provided simple means by which the letoff described can be operated automatically by the loom to effect turning of the beam without requiring the hand wheel to turn. When it is desired to effect manual turning of the beam the hand wheel will be moved to mesh the pinion 55 with gear 56, after which shaft 37 can be turned. It will also be seen that the collar 60 by its engagement with hand hold 43 automatically disengages the clutch to permit free rotation of the worm 36 whenever the hand wheel moves to operative position. Both the springs 45 and 57 will be desirable if collar 60 is omitted, but if the collar is used, one or the other of these springs acting alone will serve the dual purpose of returning the hand wheel to normal idle position and reestablishing driving relation between the clutch members 39 and 40.

Having thus described my invention it will be seen that changes and modifications may be made therein by those skilled in the art without departing from the spirit and scope of the invention and I do not wish to be limited to the details herein disclosed, but what I claim is:

1. In letoff mechanism for a loom having a warp beam turning forwardly to deliver warp, weighted means tending to turn backwardly, worm and worm wheel connections between the beam and weighted means, driving mechanism for the worm including a clutch having a driven member turning with the worm and a loom operated driving member to turn the driven member; normally stationary manual means normally in non-working position but movable to a working position into operative relation with respect to the worm, and means operated by the manual means when the latter moves to the working position thereof to separate said clutch members.

2. In letoff mechanism for a loom having a warp beam which turns forwardly to deliver warp, weighted means tending to turn backwardly, worm and worm wheel connections between the beam and the weighted means, a clutch for turning the worm including a driven member rotating with the worm and a driving member to move the driven member, loom operated means to move the driving member in a direction to cause the worm and worm wheel to effect retrograde movement of the weighted means with respect to the beam, normally idle manual means movable to a working position for manual control of the worm, means operatively connecting the manual means to the worm when the manual means is in working position, and means controlled by the manual means separating said clutch members when manual means moves to working position.

3. In letoff mechanism for a loom having a warp beam turning forwardly to deliver warp, weighted means tending normally to turn backwardly, worm and worm wheel mechanism operatively connecting the beam to the weighted means, a clutch for the worm including a driven member turning with the worm and a driving member normally engaging the driven member, loom operated means to move the driving member to cause the latter to move the driven member and worm during loom operation, manual means normally in idle non-working position but movable to a working position in operative relation with respect to the worm, and means moved by the manual means when the latter moves to the working position thereof to disconnect said driving clutch member from said driven clutch member.

4. In letoff mechanism for a loom having a warp beam turning forwardly to deliver warp, weighted means tending normally to turn backwardly, a worm rotatably mounted on the weighted means, a worm wheel meshing with the worm and secured to the beam, a driven clutch member turning with the worm, a driving clutch member normally engaging the driven member, manual means including a gear element normally in non-working position, a second gear element turning with the worm and normally out of mesh with the first gear element, said manual means movable to a working position to cause meshing of said gear elements, and means effective when the manual means moves to said working position thereof to disconnect said clutch members.

5. In letoff mechanism for a loom having a warp beam rotatable forwardly to deliver warp, a weighted member tending to turn backwardly, a worm wheel secured to the beam, a worm meshing with the worm wheel supported by and moving with the weighted means, a driven clutch member turning with the worm, a driving clutch member normally engaging the driven member and effective during loom operation to move the driven member and worm in a direction to effect retrograde movement of the weighted means relatively to the beam, a gear turning with the worm, a pinion normally out of mesh with the gear, and manual means movable to cause the pinion to mesh with the gear and simultaneously effect relative separation of the driven and driving clutch members.

6. In letoff mechanism for a loom having a warp beam turning forwardly to deliver warp, weighted means tending normally to turn backwardly, worm and worm wheel means connecting the beam to the weighted means, a clutch including a driven member turning with the worm and the driving member normally engaging the driven member and turning during loom operation to cause turning of the driven member and worm in a direction to effect retrograde movement of the weighted means relatively to the beam, a shaft slidably mounted on the weighted means from normal non-working position to a working position, a pinion on said shaft, a gear turning with the worm normally out of mesh with the pinion when said shaft is in the normal position thereof, and disconnecting means on the shaft engaging the driving clutch member, said shaft when moved from the normal to the working position thereof causing meshing of the pinion and gear and also causing movement of the driving clutch member out of engagement with the driven clutch member.

7. In letoff mechanism for a loom having a warp beam, weighted means tending to resist movement of the beam in a direction to pay off warp, mechanism including normally engaging driving and driven clutch members operatively connecting the beam and weighted means and capable of causing retrograde movement of the weighted means relatively to the beam, loom operated means driving the driving clutch member and causing said mechanism to effect said retrograde movement, normally idle manual means movable to a working position in which said manual means is operatively connected to the driven clutch member, and means moved by the manual means when the latter moves to said working position to separate said clutch members.

8. In letoff mechanism having a warp beam rotatable forwardly to deliver warp, weighted means normally tending to turn backwardly, worm and worm wheel means interconnecting the weighted means and beam effective when the worm is turning to cause relative movement of the beam and weighted means, a shaft journaled on said weighted means and slidable relatively to the latter from a normal idle position to a working position, a hand wheel secured to said shaft normally in idle position but movable with said shaft to working position, and means operatively connecting the shaft to the worm when the hand wheel and shaft move to the working positions thereof.

9. In letoff mechanism having a warp beam rotatable forwardly to deliver warp, weighted means normally tending to turn backwardly, worm and worm wheel means interconnecting the weighted means and beam effective when the worm turns to cause relative movement of the beam and weighted means, a gear turning with the worm, a pinion normally out of mesh with the gear, a hand wheel normally at rest during loom operation but movable manually to a working position, a shaft slidably mounted on the weighted means connecting the hand wheel and pinion and effective when the hand wheel moves to the working position thereof to cause meshing of said pinion and gear to permit manual turning of the worm by the hand wheel.

CARL P. BERGSTROM.

REFERENCES CITED

The following references are of record in the file of this patent:

UNITED STATES PATENTS

| Number | Name | Date |
|---|---|---|
| 84,275 | Hammond | Nov. 24, 1868 |
| 467,036 | Maertens | Jan. 12, 1892 |
| 1,803,143 | Payne | Apr. 28, 1931 |
| 2,007,023 | Payne | July 2, 1935 |
| 2,346,615 | Santon | Apr. 11, 1944 |
| 2,419,419 | Payne | Apr. 22, 1947 |